United States Patent Office 3,288,743
Patented Nov. 29, 1966

3,288,743
PLASTICIZED POLYORGANOSILSESQUIOXANE
COMPOSITIONS
David P. Spalding, Troy, N.Y., assignor to General
Electric Company, a corporation of New York
No Drawing. Filed Dec. 26, 1961, Ser. No. 162,237
6 Claims. (Cl. 260—30.6)

The present invention relates to a method for making novel organopolysiloxane compositions and to films produced therefrom. More particularly, the present invention relates to the employment of certain materials as plasticizing agents for benzene soluble organopolysiloxane compositions composed of 90 to 100 mol percent arylsiloxy units, and having an average of from 1.0 to 1.1 organic radicals per silicon atom attached to silicon through carbon-silicon linkages.

In the copending application of John F. Brown and Lester H. Vogt, Serial No. 788,069, filed January 21, 1959 and assigned to the same assignee as the present invention, there is described certain novel organopolysiloxanes and to a process for making them. The aforesaid novel organopolysiloxanes are further described therein as soluble organopolysiloxanes containing an average of from 1.0 to 1.1 silicon-bonded organic groups per silicon atom, and composed of from 90 to 100 mol percent of organosiloxy units of the formula (1) 

and having an intrinsic viscosity in benzene at 25° C. of at least 0.4 deciliter per gram, any remaining organosiloxy units of the said organopolysiloxane being selected from the class consisting of organosiloxy units of the formula (2) 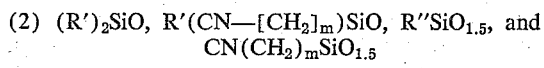

where R is an aryl radical, (e.g., phenyl, cyanophenyl, benzophenyl, tolyl, xylyl, ethylphenyl, naphthyl, biphenyl, anthracyl, phenoxyphenyl, tolyloxyphenyl radicals, etc..); R' is selected from the class consisting of aryl radicals (many examples of which have been given above), alkyl radicals (e.g., methyl, ethyl, propyl, isopropyl, butyl, cyclopentyl, cyclohexyl, etc. radicals); and alkenyl radicals (e.g., vinyl, allyl, methallyl, cyclohexenyl, etc. radicals); R" is a lower alkyl radical of from 1 to 4 carbon atoms, for instance, methyl, ethyl, propyl, butyl, etc. radicals; and $m$ is a whole number equal to from 2 to 4. Mixtures of these radicals are also contemplated.

The above described organopolysiloxanes, referred to hereinafter as "polyorganosilsesquioxanes" are preferably, polyphenylsilsesquioxanes, can be prepared as taught in the aforementioned application by initially making what is referred to therein as a "prepolymer," which can be formed by hydrolyzing an aryl trihalosilane such as phenyltrichlorosilane, and thereafter heating the prepolymer at elevated temperatures in the presence of a suitable solvent and rearrangement catalyst.

A variety of useful polyorganosilsesquioxane products can be made by the above-described Brown and Vogt method which can be converted into films, laminates, insulating coatings and the like. For example, polyorganosilsesquioxane films can be made by casting a polyorganosilsesquioxane from an organic solvent solution onto a smooth substrate. These films are of particular interest to the electrical industry as polyorganosilsesquioxane made in accordance with the aforementioned Brown and Vogt method, have high temperature stability and valuable electrical properties. Among the applications to which these films can be advantageously utilized by the electrical industry, include for example, dielectric medium for capacitors and insulating wrapping material for electric coil windings for motors and generators and the like.

Although film cast from polyorganosilsesquioxanes produced by the Brown and Vogt method is of substantial interest to industry, it has not been advantageously utilized in many applications. One reason why polyorganosilsesquioxane film has not been employed to a greater extent in various applications, is that prior to the present invention continuous film-forming methods were only feasible with polyorganosilsesquioxanes over a limited range of intrinsic viscosity, i.e. below about 3. Attempts to make organic solvent casting solutions of polyorganosilsesquioxanes having intrinsic viscosities above 3 such as 4 or higher, were unsuccessful because the casting solution invariably lacked the minimum solids content, i.e. about 4 percent by weight, required to continuously form satisfactory film. Attempts to increase the solids level of a casting solution containing a polyorganosilsesquioxane having an intrinsic viscosity above about 3, invariably raised the solution viscosity so that the casting solution became too viscous for continuous casting methods. In addition, film cast from prior art polyorganosilsesquioxanes lacked the physical toughness necessary for various applications, particularly where it was required to apply the film in a continuous manner. For example, prior art polyorganosilsesquioxane film does not possess the degree of elongation necessary for continuously wrapping it in the form of an insulator in and about transformer coils, so that it will be properly anchored in place. These polyorganosilsesquioxane films moreover, cannot be adavntageously utilized as a dielectric material in the production of capacitors by conventional high speed winding operations with materials such as aluminum foil. A dielectric material is required in these operations that will be able to withstand splitting or cracking when creased or while being subjected to suddenly applied stress. It would be desirable therefore, to be able to continually cast polyorganosilsesquioxane film in an easy and convenient manner without regard to the intrinsic viscosity of the polyorganosilsesquioxane utilized, while producing a film possessing the degree of toughness necessary for numerous applications in accordance with the various methods employed by industry.

The present invention is based on the discovery that films can be formed in a continuous manner from polyorganosilsesquioxanes made by the Brown and Vogt method over all ranges of intrinsic viscosity, if certain materials, hereinafter referred to as "plasticizers," are utilized in an effective amount with the polyorganosilsesquioxanes in the presence of an organic solvent, so as to form a casting solution of the plasticizer and the polyorganosilsesquioxane. These films moreover, not only can be cast in a continuous manner but they have substantially increased "toughness," as compared to the corresponding unplasticized polyorganosilsesquioxane films of the prior art. The term "toughness" as used hereinafter, will represent the product of the tensile strength (p.s.i.) and percent elongation of the film. As a result of this discovery, therefore, the organopolysiloxane films of the present invention comprising the prior art polyorganosilsesquioxane of Brown and Vogt and a plasticizer of the present invention can be advantageously utilized in a variety of applications in which the prior art film of Brown and Vogt cannot be employed.

In accordance with the present invention there is provided organopolysiloxane films comprising (A) 100 parts of a polyorganosilsequioxane having an intrinsic viscosity in benzene when measured at 25° C. of at least 0.4 deciliter per gram, said polyorganosilsequioxane being composed of from 90 to 100 mol percent of monoorganosiloxy units of formula (1) and any remaining organosiloxy units being selected from the class consisting of organosiloxy units of formula (2), and (B) 10 to 100 parts of a plasticizer selected from the class consisting of (3)    R'''—(V)$_a$—R''', R'''—(OV)$_b$—OR''' and (R'O—)$_3$PO where R' is as defined above, and R''' is a member selected from the class of aryl radicals, halogenated aryl radicals, and nitrated aryl radicals, V is a member selected from the class of arylene radicals, halogenated arylene radicals and nitrated arylene radicals, $a$ is an integer equal to 0 to 2, inclusive and $b$ is an integer equal to 0 to 10, inclusive.

Radicals included by R''' of Formula 3 are more particularly naphthyl, chloronaphthyl, nitronaphthyl, phenyl, chlorophenyl, nitrophenyl, etc. radicals; radicals included by V of Formula 3 are more particularly phenylene, chlorophenylene, nitrophenylene, naphthylene, etc.

The polyorganosilsesquioxanes employed in the production of the films of the present invention can have intrinsic viscosities in the range of between about 0.4 to as high as 5.5 or more by employing various ingredients under particular process conditions. In accordance with the method of Brown and Vogt, as described above, the preparation of these polyorganosilsesquioxanes depends on two critical steps. In the first place, it is necessary to make a "prepolymer" (which may be a homopolymer or a copolymer and which preferably, though not essentially, is free of silicon-bonded hydroxyl groups, several ways of preparing these prepolymers being more specifically described and referred to hereafter). Thereafter, this prepolymer (or precopolymer if the organosilsesquioxane contains more than one type of organosiloxy unit) is heated at elevated temperatures in the presence of the solvent and of an alkaline rearrangement catalyst.

Several methods may be employed in making these prepolymers (which for brevity is intended to include hereafter precopolymers). Thus, in the preparation of, for instance, the prepolymer from an aryltrihydrolyzable silane, for instance phenyltrichlorosilane, one method comprises hydrolyzing the latter with water in an amount sufficient to effect complete hydrolysis of the silicon-bonded hydrolyzable groups, advantageously employing a solvent such as benzene, toluene, xylene, diethyl ether, etc., as a diluent for the hydrolysis medium. The acid layer is removed and the resin layer (washed free of acid), which is advantageously in the form of an aromatic hydrocarbon solution, is treated, for instance by azeotropic distillation, to remove any of the residual water and HCl.

A variety of ways can be employed to produce the precopolymers utilized in the production of the polyorganosilsesquioxanes or more particularly the phenylsilsesquioxanes employed in the practice of the invention composed of at least 90 mol percent of monophenylsiloxy units with either diphenylsiloxy units or siloxy units containing from 1 to 2 organic radicals selected from the class consisting of alkyl, alkenyl, and cyanoalkyl radicals within the range of 10 mol percent or less. One method comprises cohydrolyzing an aryltrihydrolyzable silane with the requisite molar amount of either a diaryldihydrolyzable silane or a hydrolyzable silane of the formula (4)    Z$_n$SiY$_{4-n}$ where Z is a lower alkyl radical, alkenyl radical, or cyanoalkyl radical of from 2 to 4 carbon atoms (exclusive of the —CN radical), and Y is a hydrolyzable group, for example, halogen (e.g., chlorine, bromine, etc.), hydrocarbonoxy (e.g., ethoxy, aryloxy, etc., radical), acyloxy, etc., and $n$ is an integer from 1 to 2, inclusive.

When making copolymers for the prepolymer stage by the cohydrolysis of the aryltrihydrolyzable silane with the one or more cohydrolyzable silanes of the Formula 4, the conditions for hydrolysis are generally well known in the art and of course include the use of an amount of water sufficient to effect complete hydrolysis of all silicon-bonded hydrolyzable groups. The use of inert solvents in carrying out this hydrolysis, for instance, benzene, toluene, xylene, etc. is shown in such United States patents as, e.g., 2,504,839—Hyde; 2,456,627—Doyle; 2,470,497—Lamoreaux; and 2,383,827—Sprung.

Instead of effecting cohydrolysis of the aryltrihydrolyzable silane in combination with the other hydrolyzable silanes, one can effect interpolymerization between the aryl prepolymer obtained from the aryltrihydrolyzable silane with organopolysiloxanes already having the other desired organic group, i.e., diaryl siloxanes, siloxanes containing from 1 to 2 lower alkyl or cyanoalkyl radicals on each silicon atom, etc. For instance, the prepolymer from the phenyltrihydrolyzable silane can be interacted under heat with octamethylcyclotetrasiloxane, octaphenylcyclotetrasiloxane, tetramethyltetraphenylcyclotetrasiloxane, of with tetramethyltetracyanoalkylcyclotetrasiloxane, for instance, tetramethyltetra(beta-cyanoethyl)cyclotetrasiloxane, in the presence of a suitable solvent, such as toluene, employing an alkaline rearrangement catalyst, for effecting interpolymerization. The heating is advantageously carried out to a point where the reaction product is substantially free of silicon-bonded hydroxyl groups. This stage is desirable not only when making the precopolymers but also when making the prepolymers with the aryl trihydrolyzable silanes, for instance, the prepolymer derived from the hydrolyzate of phenyltrichlorosilane.

As specific examples of monomeric silanes which can be hydrolyzed and cohydrolyzed and polymeric siloxanes which can be copolymerized in order to make the prepolymers which are subsequently treated at elevated temperatures in the presence of the rearrangement catalyst in the requisite solvent at the concentration required to obtain polymers with intrinsic viscosities within the scope of the present invention, one can mention as the monomeric silanes, for instance, phenyltrichlorosilane; biphenyltrichlorosilane; naphthyltriethoxysilane; tolyltriacetoxysilane; anthracyltrichlorosilane, etc.

Among the cohydrolyzates which can be prepared in accordance with the above general instructions may be mentioned, for instance, the cohydrolyzates of phenyltrichlorosilane and diphenyldichlorosilane; the cohydrolyzates of phenyltrichlorosilane and methyltrichlorosilane; the cohydrolyzates of phenyltrichlorosilane and beta-cyanoethyltrichlorosilane; the cohydrolyzates of phenyltrichlorosilane and dimethyldichlorosilane; the cohydrolyzates of phenyltrichlorosilane and methyl beta-cyanoethyldichlorosilane; the cohydrolyzates of biphenyltriethoxysilane and diphenyldiethoxysilane; the cohydrolyzates of naphthyltrichlorsilane and dimethyldichlorosilane; cohydrolyzates of phenyltriethoxysilane and isopropyltriethoxysilane; cohydrolyzates of phenyltriethoxysilane and methyl vinyldiethoxysilane; etc. The use of ternary cohydrolysis reactants is no precluded, as for instance a ternary mixture of phenyltrichlorosilane, methyltrichlorosilane, and beta-cyanoethyl methyldichlorosilane; phenyltrichlorosilane, dimethyldichlorosilane and methyl phenyldichlorosilane, etc. It should, of course, be understood that when effecting cohydrolysis of two or more cohydrolyzable silanes, the hydrolyzable silanes other than the latter monoaryltrihydrolyzable silane should be present in molar concentrations of 10 mol percent or less of the total molar concentration of all the hydrolyzable silanes.

Included among the organopolysiloxanes which can be used in making copolymerized prepolymers can be mentioned, for instance, the monoarylpolysiloxanes in combination with one or more of the following, for instance, octaphenylcyclotetrasiloxane, octamethylcyclotetrasiloxane, tetramethyltetraphenylcyclotetrasiloxane, octaethylcyclotetrasiloxane, decamethylcyclopentasiloxane, the hydrolyzate of methyltrichlorosilane, tetramethyl tetra-(beta-cyanoethyl)cyclotetrasiloxane, tetramethyltetravinylcyclotetrasiloxane, etc. It will again be understood that in effecting copolymerization of the siloxanes, there will be employed for co-reaction with the hydrolyzate of the aryltrihydrolyzable silane, molar quantities of the other organosiloxane or siloxanes which do not exceed 10 mol percent of the total molar concentration of the ingredients.

For interpolymerization of the organopolysiloxanes described immediately above, one can employ from about 0.001 to about 0.1%, by weight, based on the weight of the organopolysiloxane undergoing treatment of an alkaline rearrangement catalyst, for instance, potassium hydroxide, cesium hydroxide, tetramethyl ammonium hydroxide, tetrabutyl phosphonium hydroxide, etc. The temperature at which the interaction for making the prepolymer is carried out may vary from about 75 to 175° C., for times of the order of from about 10 minutes to about 20 hours or more. Generally, the heating is continued until the prepolymer is substantially free of silicon-bonded hydroxyl groups. Solvents are advantageously employed in this copolymerization reaction. It should be noted that if the molar concentrations of organosiloxy units, other than the monoarylsiloxy unit, approach or exceed 10 mol percent, in the final polymer prepared in accordance with the present invention, the intrinsic viscosity will generally fall below 0.4.

The preparation of the polyorganosilsesquioxanes utilized in producing the films of the present invention are obtained by mixing the prepolymer, more particularly described above, with a suitable solvent in a specific critical solids concentration, and heating it at the requisite temperature and in the presence of an alkaline rearrangement catalyst for a time sufficient to attain intrinsic viscosities of at least 0.4 and higher. The most critical feature relative to the production of the polyorganosilsesquioxanes of intrinsic viscosity of 0.4 and higher employed in the practice of the invention involves employing a solvent in such an amount that in the phase undergoing reaction, the prepolymer comprises on a weight basis at least 70 percent of the total weight of the prepolymer and the solvent employed. In general, the phase undergoing reaction, i.e., the polymerizing prepolymer, can be regarded as being composed of mostly the prepolymer, whereby in this phase, the concentration relationship of solvent and prepolymer is that recited above. Among the solvents which can be employed in the practice of the invention are, for instance, diphenyl, diphenyl oxide, mixtures of the latter two ingredients (e.g., Dowtherm A, sold by Dow Chemical Co., Midland, Michigan), methyl phenyl ether, ethyl phenyl ether, cyclohexane, benzonitrile, mesitylene, durene, meta-dimethoxybenzene, etc.

The temperature at which the prepolymer is heated to convert it to the higher intrinsic viscosity state can vary from about 200° to 325° C., and advantageously within the range of from about 225° to 275° C. The rearrangement catalysts used include some of those employed in making the prepolymers, i.e., the alkali-metal hydroxides, alkali-metal silanolates, for instance, the potassium salt of methylsilanetriol, the potassium salt of phenylsilanetriol, either alone or in the form of an alcoholic, for instance, methanol solution. The amount of alkaline rearrangement catalyst used in converting the prepolymer to the higher intrinsic viscosity compositions can be varied widely, but advantageously is within the range of about 0.02 to about 0.5%, by weight, based on the weight of the prepolymer undergoing treatment. The reaction can be carried out at normal or superatmospheric pressures. Elevated pressures can be used if the boiling point of the solvent is below the temperature of reaction. The time of heating can be varied widely and will depend upon such factors as, e.g., the prepolymer undergoing reaction, catalyst, catalyst concentrations, solvent, solvent concentration, etc. Generally, times of the order of about 1 to 8 hours are sufficient for obtaining the desired intrinsic viscosity. More careful control must be exercised in the case of the prepolymer containing silanol groups than in the case where the prepolymer is free of silanol groups in order to avoid gelation and to obtain the desired intrinsic viscosity.

Because the prepolymer being converted to a polymer of the desired intrinsic viscosity has a volatility markedly below the volatility of the solvent in the prepolymer-solvent mixture, it is often found that the solvent tends to evaporate during the heating of the mixture. However, evaporation of the solvent still leaves a prepolymer-solvent mixture having a concentration within the previously stated range of at least 70% by weight prepolymer in the prepolymer-solvent mixture. In fact, it is sometimes found desirable to allow the solvent to evaporate to such an extent that when the polymer of the desired intrinsic viscosity is formed, all of the solvent is evaporated from the reaction mixture. In effect, the concentration of the solvent decreases as the intrinsic viscosity of the polymer increases. Where it is desired to allow the solvent to evaporate in this fashion, it is found that the reaction can be effected in open trays, for example, shallow trays, into which is poured a mixture of prepolymer and solvent to a depth of up to about one inch so as to facilitate the evaporation of the solvent during the course of the reaction at elevated temperature. Alternately, the prepolymer can be converted to the polymer of the desired intrinsic viscosity by pouring the prepolymer-solvent mixture onto a heated, moving surface, such as a surface of a rotary drum dryer so that the polymer can be formed from the prepolymer in a continuous manner and the solvent can be removed from the polymer of desired intrinsic viscosity prior to removal of the polymer from the drum dryer.

It has also been found that it is possible to obtain soluble polyorganosilsesquioxanes of intrinsic viscosity of 0.4 or higher by heating prepolymers of intrinsic viscosity of from 0.1 to 0.3 at temperatures of about 300° to 350° C. in the absence of a rearrangement catalyst for long periods of time, for instance, for about 300 to 400 hours. However, such treatment will not give very high intrinsic viscosity but nevertheless in one instance it has been found possible to heat a prepolymer of intrinsic viscosity of 0.18 under such conditions so as to obtain a polymer having an intrinsic viscosity of 0.51. The preferred method of treatment of the prepolymers is to carry out the final reaction in the presence of an alkaline rearrangement catalyst at elevated temperatures in the presence of a suitable solvent, employing the critical solvent concentration conditions heretofore described.

The plasticizers shown in Formula 3 above, employed with the polyorganosilsesquioxanes to produce the films of the present invention, are preferably halogenated diphenyls, polyphenyl ethers and substituted polyphenyl ethers as shown by the following formulas:

(5)

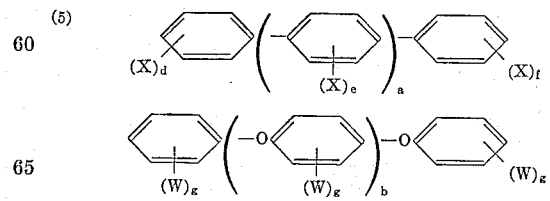

where $a$ and $b$ are as defined in Formula 3 above, X is a halogen radical, for example, bromo, chloro and preferably chloro, W is a nitro radical, $d$ is equal to from 1 to 5, inclusive, $e$ is equal to from 0 to 4, inclusive, $f$ is equal to from 0 to 5, inclusive, and $g$ is equal to from 0 to 2, inclusive.

In addition to the above-described halogenated polyphenyls and polyphenyl ethers and nitrated derivative thereof as shown in Formula 5, various aryl and alkyl phosphate esters have also been found to impart valuable properties to polyorganosilsesquioxanes as shown above in Formula 3; also, certain organopolysiloxanes having a molecular weight in the range of about 300 to 3,000 and included by the formula (6) 

where R' is as defined above, and $c$ is equal to 1 to 3, have been found to be operable.

Included among the polyphenyl plasticizers shown in Formula 5 above are chlorinated biphenyls having about 54 weight percent chlorine, such as pentachlorobiphenyl, blends of chlorinated biphenyls and triphenyls having approximately 65 percent by weight chlorine, including octachlorobiphenyl and undecylchlorotriphenyl, and blends of chlorinated biphenyls, and triphenyls having about 56 percent by weight chlorine such as hexachlorobiphenyl and nonachlorotriphenyl. Included among the polyphenylethers shown by Formula 5 above are more specifically bis(3,3-phenoxyphenyl)ether, m-nitrophenyl-phenyl ether, m-diphenoxybenzene, bis-(p-nitrophenyl)ether, etc. Specific examples of the organopolysiloxane plasticizers shown in Formula 6 above are tris-(trimethylsiloxy)phenylsilane, bis-(trimethylsiloxy)diphenylsilane, triphenylsilanol, bis [dimethyl,β-(dimethylphenylsilyl)ethyl] disiloxane, bis [dimethyl,β - (triphenoxysilyl)ethyl]disiloxane, etc. In addition to the aforementioned plasticizers, triorganophosphates that are included by Formula 3 are for example, triphenylphosphate, and triethylphosphate.

The films of the present invention can vary in a thickness of between about 0.1 mil to about 150 mils and can be made by uniformly incorporating the plasticizer into the polyorganosilsesquioxane. The incorporation of the plasticizer into the polyorganosilsesquioxane is preferably accomplished by effecting the dissolution of the plasticizer and polyorganosilsesquioxane in a volatile organic solvent. The organopolysiloxane compositions of the present invention can thereafter be readily formed into a film by allowing the aforedescribed solution of plasticizer and polyorganosilsesquioxane to contact a smooth substrate while effecting the separation of the volatile organic solvent therefrom. A film can be formed from the casting solution in a continuous manner moreover, if desired, such as at temperatures in the range of between about 25° C. to about 350° C., by employing a means for conveying the casting solution from a hopper onto a moving belt to a knife edge, and subsequently around a rotating drum.

Organic solvents that can be advantageously employed to form a casting solution of the plasticizer and the polyorganosilsesquioxane to provide for the continuous production of the composition of the present invention in the form of a film are any organic solvents inert to the components of the solution and boiling in the range of between about 20° C. to about 200° C. Suitable organic solvents, include for example, chloroform, benzene, chlorobenzene, tetrahydrofuran and methylene chloride.

In order to provide for the continuous production of film in accordance with the practice of the invention, experience has shown that it is desirable to maintain the solids content of the mixture comprising the plasticizer and polyorganosilsesquioxane in the range of about 4% to about 30% based on the weight of solution. In addition, it has also been found desirable when making films in a continuous manner in accordance with the practice of the invention to maintain the viscosity of the solution between about 2,000 centipoises to about 80,000, preferably 2,000 to 60,000 centipoises at 25° C.

In order that those skilled in the art will be better able to practice the invention, the following examples are given by way of illustration and not by way of limitation. All parts are by weight.

*Example 1*

A polyphenylsilsesquioxane was prepared as follows in accordance with the teachings of the aforementioned Brown and Vogt application.

About 1058 parts phenyltrichlorosilane was dissolved in 1416 parts diethyl ether. This solution was placed in a reaction flask cooled by a cold water bath. The solution was stirred while 540 parts water were introduced slowly at a rate such that the temperature in the reaction mixture did not exceed 25° C. The hydrolyzate was then washed with water until neutral and thereafter heated over a steam bath to remove the diethyl ether. When the hydrolyzate became syrupy, about 1800 parts benzene was added and a Dean Stark trap was attached and the solution refluxed with water ceased to come over. This azeotropic distillation removed essentially all of the water. The distillation was continued to remove benzene until a solution was obtained which contained about 47.6%, by weight, of a prepolymer of monophenylsiloxane containing some residual silanol groups. To about 105 parts of the hydrolyzate solution was added 13 parts of a mixture of diphenyl and diphenyl ether (the mixture being in a weight ratio of 26.5 and 73.5%) and about 0.05 part KOH in the form of a solution of methanol. After thorough mixing, the ingredients were heated to about 250° C. thereby removing the methanol, water and benzene. Thereafter, the vessel in which the heating was proceeding was loosely stoppered, heating continued at 250° C., for about one hour. The reaction mixture was allowed to cool to give a polyphenylsilsesquioxane in the form of a white solid, which was dissolved with slight warming in benzene and the benzene solution treated with a small amount of acetic acid to neutralize the catalyst employed in the reaction. The solution was filtered and then poured slowly into a sufficient amount of methanol to precipitate the desired polymer which was obtained in the form of long white fibers. This polymer had an intrinsic viscosity of about 4 as determined by the procedure shown in the aforementioned Brown and Vogt application.

*Example 2*

A casting solution having 6% solids is made from 4 parts of the polyphenylsilsesquioxane of Example 1, and 2 parts of pentachlorobiphenyl, utilizing chlorobenzene as a solvent. This solution has a viscosity of about 30,000 centipoises at 25° C. A film is cast in a continuous manner from this casting solution by continuously pouring it onto a steel conveyor belt at a temperature of about 90° C. and winding the resulting film onto a steel drum.

A solution having 6% solids and free of plasticizer is made from the polyphenylsilsesquioxane of Example 1 and chlorobenzene. It is found that the viscosity of the solution is about 100,000 centipoise at 25° C. One skilled in the art would know that a satisfactory film could not be formed in a continuous manner from this solution as its viscosity is too high.

Casting solutions having a solids content in the range of about 6% were respectively formed in benzene with the polyphenylsilsesquioxane of Example 1 utilizing various plasticizers within the scope of Formula 3. The film-forming organopolysiloxane compositions that were formed in the respective casting solutions, were comprised of about 2 to 3 parts of polymer to about 1 part of plasticizer. A film was cast from each of the casting solutions by pouring the solution onto a glass plate covered with polyethyleneterephthalate and allowing the benzene to evaporate.

In addition to making a variety of plasticized films in accordance with the practice of the invention by using various plasticizers within the scope of Formula 3, a film was prepared by the above procedure utilizing as a plasticizer, the phenylsilsesquioxane disclosed in Brown Patent 3,000,858. Films were also cast from the polyphenylsilsesquioxane of Example 1 with various conventional plasticizers outside the scope of Formula 3, and a film was cast without a plasticizer.

Table I below shows the results obtained when the various films made in accordance with the practice of the invention containing a plasticizer within the scope of Formula 3 were evaluated for toughness in terms of tensile product as compared to films containing the prior art phenylsilsesquioxane as taught by Brown Patent 3,000,858, and a film containing no plasticizer. In Table I below, "Tensile Product" is derived from the product of tensile strength (p.s.i.), and elongation (percent).

TABLE I

| Plasticizer | Plasticizer | Polymer | Tensile Product |
|---|---|---|---|
| None | 0 | 1 | 3.48×10⁴ |
| Dodecylphenylsilsesquioxane | 1 | 3 | 7.5×10⁴ |
| Bis (m-phenoxyphenyl)ether | 1 | 2 | 15.1×10⁴ |
| Bis-(m-phenoxyphenyl)ether | 1 | 3 | 13.8×10⁴ |
| m-Nitrophenylphenyl ether | 1 | 3 | 15.8×10⁴ |
| m-Diphenoxybenzene | 1 | 3 | 11.9×10⁴ |
| Bis (phenoxyphenyl)ether | 1 | 2.5 | 11.7×10⁴ |
| Triphenyl Phosphate | 1 | 2.5 | 13.7×10⁴ |
| Pentachlorobiphenyl | 1 | 2 | 14.4×10⁴ |

In addition to the plasticizers shown in Table I above, other organic plasticizers, among which were benzophenone, dibenzofuran, 2-methoxynaphthalene, acenaphthenequinone, acridone, etc., were also evaluated. It was found that only a slight improvement in toughness was obtained compared to the film free of plasticizer.

In addition to evaluating the films of the present invention for toughness, electrical properties such as dielectric strength in terms of volts per mil and dielectric constant were also measured and compared to films of the polyphenylsilsesquioxane of Example 1, free of plasticizer. It was found that the films of the present invention had substantially the same valuable electrical properties as films formed without plasticizer.

Based on the results shown in Table I, one skilled in the art would know that the films of the present invention possess the necessary toughness, required in various applications utilized in industry.

In addition to having satisfactory toughness and electrical properties for various electrical applications, films of the present invention are also quite valuable for food packaging, insulating applications, tapes, and the like. Solutions having a solids content of from 1% to about 30% of the film-forming ingredients of the present invention dissolved in an organic solvent as previously described, can also advantageously be employed as lacquers.

While the foregoing examples have of necessity been directed to only a few of the very many variables within the scope of the present invention, it should be understood that the present invention covers the use of a much broader class of organosilsesquioxanes as described theretofore, in combination with various plasticizers as shown in Formula 3 to produce a much broader variety of compositions in the form of films within the scope of the present invention.

What I claim as new and desire to secure by Letters Patent of the United States is:

1. Films comprising (A) 100 parts of a polyorganosilsesquioxane having an intrinsic viscosity in benzene when measured at 25° C. of at least 0.4 deciliter per gram, which is produced by (1), heating to a temperature between 200° C. to 325° C., a mixture of an organosilsesquioxane prepolymer, an organic solvent for the organosilsesquioxane prepolymer, and a rearrangement catalyst, while maintaining the solids concentration of the organosilsesquioxane prepolymer in the mixture during the reaction at least about 70% by weight of the organosilsesquioxane prepolymer and the organic solvent and (2), recovering an organosilsesquioxane polymer having a molecular weight higher than the organosilsesquioxane prepolymer, said polyorganosilsesquioxane prepolymer being composed of from 90 to 100 mol percent of monoorganosiloxy units of the following formula $$RSiO_{1.5}$$

and any remaining organosiloxy units being selected from the class consisting of organosiloxy units having the following formula $$(R')_2SiO, \; R'(CN-[CH_2]_m)SiO, \; R''SiO_{1.5}$$

and $$CN(CH_2)_mSiO_{1.5}$$

and (B) 10 to 100 parts of a plasticizer selected from the class consisting of bis(m-phenoxyphenyl)ether, m-nitrophenylphenyl ether, m-diphenoxybenzene, bis(3,3-phenoxyphenyl)ether, triphenyl phosphate, and pentachlorobiphenyl, where R is an aryl radical, R' is a member selected from the class consisting of aryl radicals, alkyl radicals and alkenyl radicals, R'' is a lower alkyl radical, and $m$ is a whole number equal to from 2 to 4, inclusive.

2. A film in accordance with claim 1, where the polyorganosilsesquioxane prepolymer is composed of 90 to 100 mol percent of phenylsiloxane units.

3. A film in accordance with claim 1 comprising (A) 100 parts of a polyphenylsilsesquioxane having an intrinsic viscosity in benzene when measured at 25° C. of at least 0.4 deciliter per gram, said polyphenylsilsesquioxane being composed of from 90 to 100 mol percent of phenylsiloxane units and any remaining organosiloxane units being selected from the class consisting of dimethylsiloxane units, methylcyanoethylsiloxane units, methylsiloxane units, and cyanoethylsiloxane units and (B) 10 to 100 parts of a pentachlorobiphenyl.

4. An organic solvent solution having a viscosity of from 2,000 to 80,000 centipoises at 25° C., and a solids content of from 4 to 30 percent based on the weight of said solution of an organopolysiloxane composition comprising (A) 100 parts of a polyorganosilsesquioxane having an intrinsic viscosity in benzene when measured at 25° C. of at least 0.4 deciliter per gram, which is produced by (1), heating to a temperature between 200° C. to 325° C., a mixture of an organosilsesquioxane prepolymer, an organic solvent for the organosilsesquioxane prepolymer and a rearrangement catalyst, while maintaining the solids concentration of the organosilsesquioxane prepolymer in the mixture during the reaction at least about 70% by weight of the organosilsesquioxane prepolymer and the organic solvent and (2), recovering an organosilsesquioxane polymer having a molecular weight higher than the organosilsesquioxane prepolymer, said polyorganosilsesquioxane prepolymer being composed of from 90 to 100 mol percent of monoorganosiloxy units of the following formula $$RSiO_{1.5}$$

and remaining organosiloxy units being selected from the class consisting of organosiloxy units having the following formula $$(R')_2SiO, \; R'(CN-[CH_2]_m)SiO, \; R''SiO_{1.5}$$

and $$CN(CH_2)_mSiO_{1.5}$$

and (B) 10 to 100 parts of a plasticizer selected from the class consisting of bis(m-phenoxyphenyl)ether, m-nitrophenylphenyl ether, m-diphenoxybenzene, bis(3,3-phenoxyphenyl)ether, triphenyl phosphate, and pentachlorobiphenyl, where R is an aryl radical, R' is a member selected from the class consisting of aryl radicals, alkyl radicals and alkenyl radicals, R'' is a lower alkyl radical, and $m$ is a whole number equal to from 2 to 4, inclusive.

5. A method for continuously casting a film comprising continuously contacting the organic solvent solution of claim 4 to a smooth substrate at a temperature in the range of from 20° C. to 350° C.

6. An organopolysiloxane composition comprising (A) 100 parts of a polyorganosilsesquioxane having an intrinsic viscosity in benzene when measured at 25° C. of at least 0.4 deciliter per gram, which is produced by (1), heating to a temperature between 200° C. to 325° C., a mixture of an organosilsesquioxane prepolymer, an organic solvent for the organosilsesquioxane prepolymer and a rearrangement catalyst, while maintaining the solids concentration of the organosilsesquioxane prepolymer in the mixture during the reaction at least about 70% by weight of the organosilsesquioxane prepolymer and the organic solvent, and (2), recovering an organosilsesquioxane polymer having a molecular weight higher than the organosilsesquioxane prepolymer and substantially free of the organic solvent, said polyorganosilsesquioxane prepolymer being composed of from 90 to 100 mol percent of monoorganosiloxy units of the following formula $$RSiO_{1.5}$$

and any remaining organosiloxy units being selected from the class consisting of organosiloxy units having the following formula $$(R')_2SiO, R'(CN-[CH_2]_m)SiO, R''SiO_{1.5}$$

and $$CN(CH_2)_mSiO_{1.5}$$

and (B) 10 to 100 parts of a plasticizer selected from the class consisting of bis(m-phenoxyphenyl)ether, m-nitrophenylphenyl ether, m-diphenoxybenzene, bis(3,3-phenoxyphenyl)ether, triphenyl phosphate, and pentachlorobiphenyl, where R is an aryl radical, R' is a member selected from the class consisting of aryl radicals, alkyl radicals and alkenyl radicals, R'' is a lower alkyl radical, and $m$ is a whole number equal to from 2 to 4, inclusive.

References Cited by the Examiner

UNITED STATES PATENTS

| | | | |
|---|---|---|---|
| 2,549,127 | 4/1951 | Pew | 260—33.8 XR |
| 2,732,355 | 1/1956 | Ryan | 260—33.8 XR |
| 2,868,766 | 1/1959 | Johannson | 260—33.8 XR |
| 3,000,858 | 9/1961 | Brown | 260—46.5 |
| 3,017,386 | 1/1962 | Brown et al. | |

OTHER REFERENCES

Buttrey, D. N.: Plasticizers, London, Cleaver-Hune, 1957, pp. 110–114.

MORRIS LIEBMAN, *Primary Examiner.*

A. H. KOECKERT, J. H. DERRINGTON,
*Assistant Examiners.*